United States Patent [19]
Webster et al.

[11] Patent Number: 5,969,014
[45] Date of Patent: Oct. 19, 1999

[54] SYNERGISTIC POLYAMIDE STABILIZATION METHOD

[75] Inventors: Joseph R. Webster, Charlotte, N.C.; Klaus H. Stoll, Binzen, Germany; Ján Malik, Saint Louis; Mohamed Sidqi, Mulhouse, both of France

[73] Assignee: Clariant Finance (BVI) Limited, Tortola, Virgin Islands (Br.)

[21] Appl. No.: 08/936,008

[22] Filed: Sep. 23, 1997

[51] Int. Cl.⁶ .................. C08K 5/34; C08K 5/35; C08K 5/53
[52] U.S. Cl. ................. 524/100; 524/95; 524/96; 524/97; 524/99; 524/102; 524/126; 524/227
[58] Field of Search ................ 524/95, 96, 97, 524/99, 100, 102, 126, 227

[56] References Cited

U.S. PATENT DOCUMENTS

| | | | |
|---|---|---|---|
| 4,107,138 | 8/1978 | Hofer et al. | 524/126 |
| 4,474,914 | 10/1984 | Spivak | 524/126 |
| 4,902,299 | 2/1990 | Anton | 8/442 |
| 5,045,083 | 9/1991 | Bennett | 8/442 |
| 5,147,935 | 9/1992 | Volmer et al. | 524/152 |
| 5,338,319 | 8/1994 | Kaschig et al. | 8/586 |
| 5,380,774 | 1/1995 | Mulholland | 524/102 |
| 5,438,088 | 8/1995 | Stevenson et al. | 524/120 |

FOREIGN PATENT DOCUMENTS

| | | |
|---|---|---|
| 2260764 | 4/1993 | United Kingdom . |
| 2293827 | 4/1996 | United Kingdom . |
| WO 97/43335 | 11/1997 | WIPO . |

*Primary Examiner*—Kriellion A. Sanders
*Attorney, Agent, or Firm*—Miles B. Dearth

[57] ABSTRACT

A use for synergistic additives for polyamides is disclosed by forming a uniform and intimate mixture with polyamide with a component system selected from (I) (II) or (III) (on a weight basis) where (I) is from 0.01% to 1% of a sterically hindered phenyl phosphonite (Ia) with from 0.05% to 5% of a non-hydroxyl substituted oxanilide(Ib) (together 1a+1b), or Ia together with an aromatic di-carbonyl compound containing two hindered amine moieties (together Ia+c). Preferably the weight ratio of Ia to Ib and Ia to Ic is from 1:3 to 1:10, more preferably 1:4, 1:5 or 1:6 and most preferably 1:5; and (II) is from 0.05 to 5% of a non-hydroxyl substituted oxanilide containing at least two hindered amine groups (a) together with from 0.05 to 5% of the aromatic di-carbonyl compound (b), (II a+b), or (III) from 0.01% to 1% of a sterically hindered phenyl phosphonite, from 0.05 to 5% of a non-hydroxyl substituted oxanilide, and from 0.05 to 5% of an aromatic di-carbonyl compound. There are specified preferred weight ratio of (a) to (b), (a) to (c).

Disclosed are articles of manufacture containing organic dye, and absent metallized chromium dye which are useful for molded articles, extruded articles or fibers of polyamide exhibiting outstanding color brightness and color stability.

23 Claims, No Drawings

SYNERGISTIC POLYAMIDE STABILIZATION METHOD

FIELD OF THE INVENTION

The invention pertains to methods to stabilize polyamide polymers.

BACKGROUND OF THE INVENTION

The service life of polyamides is dependent on (1) the raw materials used in the manufacturing process, (2) the additives used in stabilizing the polymer against damage brought about by melt-processing and (3) environmental weathering factors. A serious drawback to providing stabilization systems for polyamides lies in the fact that the maximum concentration of many additives is limited. Polyamides are heretofore regarded as poor in solvating additives, especially nonpolar additives having relatively low molecular weight in relation to the polyamide polymer. The aesthetics of an article such as an injection molding can be affected such as by migration, blooming or plate-out of the additives. On the other hand, manufacturers of polyamide-based moldings and extrusions strive to include low concentrations of additives for economic reasons.

Oxalic acid dianilides, formed on condensing the acid, partial ester or di-ester with one or two moles of aniline derivatives are known light stabilizers. Unsymmetrical oxalic acid dianilides are described, for example in U.S. Pat. No. 4,003,875. U.S. Pat. No. 4,544,691 discloses stabilizer compounds containing UV-absorbing derivatives of oxanilide, benzalmalonates, α-cyanocinnamates and o-hydroxyphenylbenzotriazoles, having a reactive phenolic group(s). These additives are suggested for use with polymer coating materials.

Polyamide polymers are characterized by high tensile strength, modulus and abrasion resistance, however polyamides require stabilization against thermo-oxidative and photodegradation for demanding use applications. Therefore, further improvement in the stabilization systems for these materials is presently desired in such end uses as fibers, and especially in relatively high temperature processing of injection moldings. The polyamide structure contains labile hydrogens and exert reductive or basic properties which are problematic from the standpoint of colorants. For example, in polyamide, organic red dyes undergo significant loss of shade upon thermal processing at the typical melt processing temperatures for polyamide. It would be desirable to lessen the tendency of polyamide to exert this influence on dyes without sacrificing the desired physical properties of polyamides.

The evolution of polyamide stabilization systems has advanced from earlier recommended hindered phenolic types, for example Irganox® 1098, to a combination of an antioxidant and a benzotriazole, such as the combination of Irganox® 1098 with Tinuvin® 234. Lightfast and photochemically stable dyed polyamide fibers containing oxalic acid di-aryl amides with a copper complex are known, for example from U.S. Pat. No. 5,338,319. These are applied in aqueous dye baths. In contrast, the present invention is directed to additives which are dispersed within the polyamide polymer by melt-processing at high temperatures above the glass transition, as in extrudates or moldings.

A stabilization system for polyamides has been found which exhibits unexpected synergisitic improvements. There is provided a modification of polyamide at low effective additive concentrations with improved technical and economic effects.

SUMMARY OF THE INVENTION

In accordance with the fundamental aspect of the invention there is provided a process of using specified additives which act synergistically in polyamides, comprising incorporating the additives under melt processing with polyamide, and forming a uniform and intimate mixture, the components, on a weight basis are:

(I) from 0.01% to 1% of a sterically hindered phenyl phosphonite (Ia) with from 0.05% to 5% of a non-hydroxyl substituted oxanilide(Ib) (together 1a+1b), or Ia together with an aromatic di-carbonyl compound containing one or two hindered amine moieties (together Ia+c). The weight ratio of Ia to Ib is from 1:3 to 1:10 and the weight ratio of Ia to Ic is from 1:3 to 1:10. The preferred weight ratios for both 1a to 1 b as well as 1a to 1c is 1:3 to 1:6. The most preferred weight ratios of 1a to 1b and 1a to 1c are 1:4, 1:5 or 1:6 and most preferably 1:5;

(II) from 0.05 to 5% of a non-hydroxyl substituted oxanilide II(a), together with from 0.05 to 5% of an aromatic di-carbonyl compound containing one or two hindered amine moieties II(b), (II a+b). The weight ratio of II(a) to II(b) is from 1:5 to 5:1, preferably 1:3 to 3:1, and most preferably 1:1: and (III) from 0.01% to 1% of a sterically hindered phenyl phosphonite, from 0.05 to 5% of a non-hydroxyl substituted oxanilide, and from 0.05 to 5% of an aromatic di-carbonyl compound. The weight ratio of phosphonite to oxanilide is from 1:5 to 5:1, preferably 1:3 to 3:1, and most preferably 1:1.

The invention enables the effective use of economical organic colorants, such as solvent soluble, or polymer soluble organic dyes, for example, acid dispersed dyes, azo and diazo dyes, phthalocyanine blues and greens, diarylide yellows, perylenes, quinacridone, and the like. Therefore another aspect of the invention is a colored article of manufacture such as a molding, extruded article or fiber of polyamide.

DETAILED DESCRIPTION OF INVENTION

Polyamides stabilized according to the invention include the synthetic aliphatic, semi-aromatic and aromatic polyamides. Examples include Nylon 6, nylon-6.6, Nylon-6.10, nylon 6.11, nylon-6.12, nylon 11, nylon 12, and copolymers such as nylon-6.6/6, nylon-6.6/6.10, 6/11, 6/12; polyether-polyamide block copolymers, poly(m-phenyleneisophthalamide), poly(p-phenyleneterephthalamide), and the like all of which are commercially available from a variety of sources. The method includes using the stabilization system with formulated polyamides, including conventional impact toughened polyamide, and reinforced polyamides containing glass fiber, mineral and glass/mineral combinations. The invention can be practiced with polyamides regardless of the polymer morphology. Amorphous, semi-crystalline or highly crystalline polyamides as well as blends of different crystallinity are benefited. Commercially available polyamide resins are known from sources such as BASF, DSM, Evansville, Ind., E I duPont de Nemours, Wilmington, Del.; formulated polyamides are available from Ferro Corp., Cleveland, Ohio, Hanna Engineered Materials, Bethlehem, Pa., Hüls America, Somerset, N.J., and A. Schulman, Akron, Ohio; reinforced polyamides are available from DSM RIM Nylon, Westlake, Ohio.

The following amounts of each component selected according to the invention are critical to synergistic improvements and are indicated as weight percentage of the polyamide composition. The invention can be practiced by incorporating the additive system directly into heated zones of a compounding extruder containing the polyamide to be stabilized or by first forming an intermediate masterbatch compound which containing the selected system in a carrier polymer which is a polyamide or a is a polymer which is intimately dispersible in polyamide, or by other methods commonly used in the art to incorporate additives into polymers.

According to the selection of (I a+b) above, from 0.01 to 1% of sterically hindered phenyl phosphonite is used, preferably the usage level is from 0.05% to 0.5% with the most preferred level from 0.05 to 0.2% of the phosphonite. The specified oxanilide used in either (I) or (II) is possible at a level of from 0.05% to 5%, preferably at from 0.2% to 2%, and most preferably at from 0.3% to 1%.

The aromatic di-carbonyl compound containing one or more piperidine groups is used generally at from 0.05% to 5%, preferably 0.2% to 2% and most preferably from 0.3% to 1%.

According to (I) above the weight ratio of (Ia) to (Ib) or the ratio of (Ia) to (Ic) is 1:3 to 1:10, especially 1:4, 1:5, 1:6, 1:7, 1:8, and 1:9. According to IIa+b above, the weight ratio of IIa to IIb is from 1:5 to 5:1, especially 1:4, 1:3, 1:2, 1:1, 2:1, 3:1, and 4:1, with the most preferred weight ratio of from 1:2 to 2:1. The sterically hindered phenyl phosphonites used herein have the following general structure:

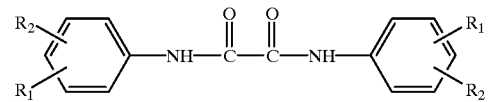

wherein each R is independently selected from unsubstituted phenyl or a substituted phenyl with one, two or three $C_{1-12}$ alkyl groups, such as, methyl, ethyl, propyl, butyl, isobutyl, tert butyl groups. Preferably R is a di-tert.-butyl phenyl group (i.e., at the 2,4-position), n is 0 and A is a monofunctional or difunctional residue of a phenyl, diphenyl, diphenyl ether, diphenylmethane, or dibenzofuran group. Preferably A is a diphenyl residue, n=1, and R is a 2,4-di-t-butyl phenyl group or 2,4-di-t-butyl-5-methyl phenyl group. The term "sterically hindered" refers to the presence of at least one substituent different from hydrogen, in ortho position to the functional center of the respective group. The most preferred phenyl phosphonites are the reaction products of sterically hindered alkylphenols, such as 2,4-di-tertiarybutylphenol, with the Friedel-Crafts reaction product of biphenyl and $PCl_3$. An exemplary reaction product has the following structure:

(A2)

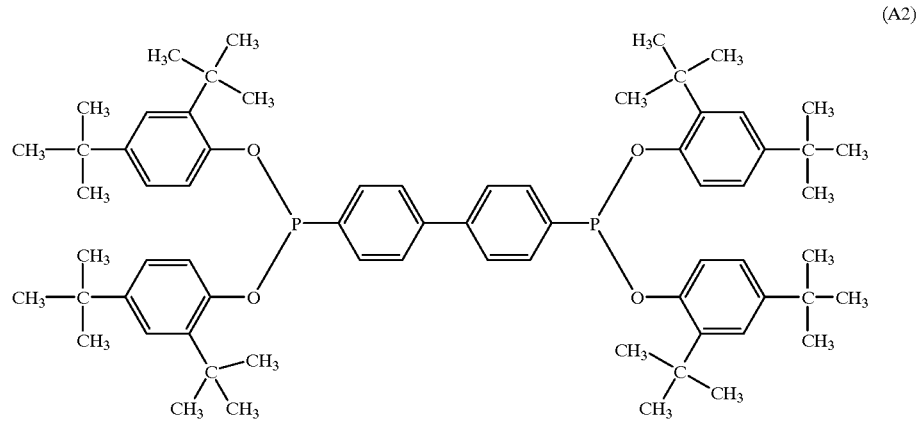

The preferred sterically hindered phosphonite containing A-2 as one component in a mixture is Sanduvor® P-EPQ available from Clariant. The oxanilides used in the invention are non-hydroxyl substituted oxanilides. These include, for example, compounds having the following structures:

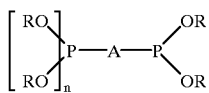

wherein $R_1$ and $R_2$ are each independently, identical or different substituents selected from hydrogen, linear or branched alkyl or alkoxy groups having from 2 to 12 carbon atoms and from 1 to 4 oxygen atoms; preferably one R group on each ring is hydrogen, one is ethyl and the other is a $C_2$ to $C_4$ alkoxy group, both located at the 5 position of each ring. The preferred oxanilides have such structures as:

(LS-1)

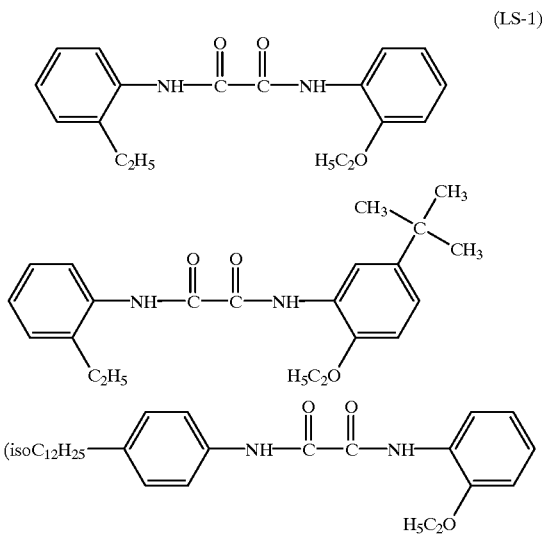

Commercially available non-hydroxyl substituted oxanilides include Sanduvor® VSU, EPU and 3206, and Tinuvir®

312 and 315, and the like. The most preferred oxanilide is commercially available from Clariant, as Sanduvor® VSU.

The method according to (Ib) or (II) includes the use of a particular aromatic amide or aromatic ester-amide (aromatic (ester)amide) which contains at least one hindered amine group adjacent to a carbonyl carbon. The structure is given by:

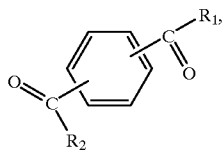

$R_1$ and $R_2$ are identical or different and selected from the group consisting of:

(A)

(B)

$R_1$ and $R_2$ are identical or different and selected from the group consisting of:

(I)

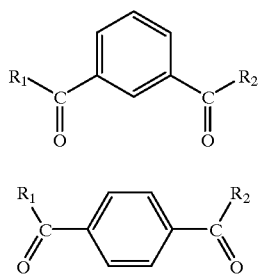

(II)

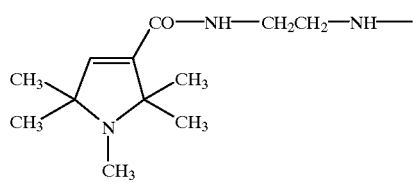

(III)

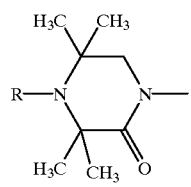

(IV)

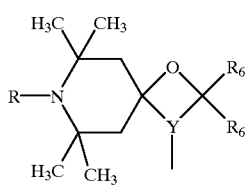

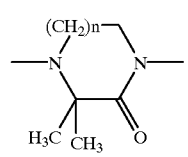

(V)

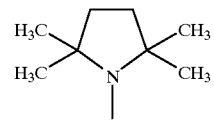

(VI)

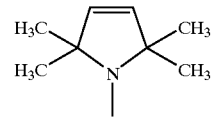

(VII)

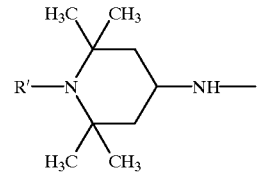

(VIII)

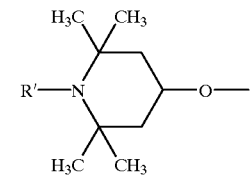

(IX)

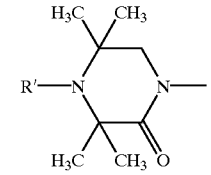

wherein R is either Hydrogen, $C_{1-8}$-alkyl, $C_{1-8}$-alkoxy, or —$COR_3$, where $R_3$ is hydrogen, $C_{1-6}$-alkyl, phenyl, —COO ($C_{1-4}$-alkyl) or $NR_{15}R_{16}$ where $R_{15}$ is hydrogen, $C_{1-12}$-alkyl, $C_{5-6}$cycloalkyl, phenyl or ($C_{1-12}$alkyl)phenyl; and R' is Hydrogen, $C_{1-6}$-alkyl, $C_{1-4}$-alkoxy, or —CO—$C_{1-4}$ alkyl $R_{16}$ is $C_{1-12}$-alkyl or hydrogen or $R_{15}$ and $R_{16}$ together with the N atom to which they are attached form a five- to seven-membered ring which may contain an additional N or O atom (preferably forming a piperidine or morpholine ring); and Y is the group

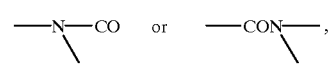

where CO forms part of the cyclic structure; each $R_6$ of structure (III) independently is selected from hydrogen, $C_{1-2}$ alkyl or phenyl provided only one $R_6$ can be phenyl, or both groups $R_6$ together form the group —($CH_2$—($CH_2$)$_n$ where n is 1 or 2, —$C(CH_3)_2$, —$C(CH_3)_2$—$CH_2$—$CH_2$— or —$C(CH_3CH_2CH_2CH(CH_3)$—.

The most preferred aromatic amide is a di-amide having the following structure:

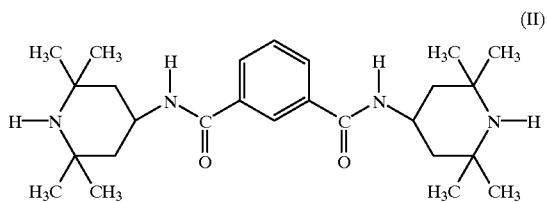

(II)

and is commercially available as NYLOSTAB S-EED from Clariant.

In an alternative approach, the aromatic diamide contains $R_1$ and $R_2$ groups which are hydrocarbyl groups other than hindered piperidinyl groups. The substituent groups $R_1$ and $R_2$ on (A) or (B) may be independently selected from the group consisting of the radicals of substituted or unsubstituted linear or branched alkyl amine(s) having 8 to 20 carbon atoms, such as octyl amine and dodecylamine; substituted or unsubstituted aromatic amine, aminocarboxylic acid or corresponding lactam; also oligomers of about 10 to 20 repeating units of the aromatic dicarbonyl and a diamine or aminocarboxylic acid.

In the alternative utilizing a non-hindered amino aromatic dicarbonyl compound, systems I, II or III will contain additionally a compound containing one or more hindered piperidine groups, such as those known in the art, commercially available and mentioned hereinbelow. The non-hindered amino aromatic dicarbonyl compound can be made by reacting a dicarboxylic acid chloride, for example isophthalic acid chloride, and a hydrocarbyl amine, with or without catalyst and then working up with a suitable base as is the known technique. Optional catalyst for accelerating the reaction would include, for example, alkali metal alkoxides, hydrides, or amides. There are a number of suitable commercially available HALS employable in the alternative system, such as for example, products of Ciba Specialty Chemicals, under the TINUVIN trademark, e.g. TINUVIN 770

Conventional additives may optionally be present in the polyamide which is modified according to the invention, for example, primary thermal stabilizers, light stabilizers, lubricants, pigments, reinforcing and or non-reinforcing fillers, and the like. Conventional primary antioxidants are suggested for inclusion herein at conventional amounts. Antioxidants include, for example alkylated monophenols, alkylated hydroquinones, alkylidenebisphenols, hindered alkyl benzyl compounds, acylaminophenols, esters of β-(3, 5-di-tert-butyl-4-hydroxyphenyl) propionic acid, and the like which are disclosed in U.S. Pat. No. 5,051,459 incorporated herein by reference. A commercially available antioxidant is IRGANOX® 1098 from Ciba Specialty Chemicals.

UV absorbers include, for example, the class of benzotriazoles such as 2-(2'-hydroxphenyl)benzotriazoles, for example 2-(2'-hydroxy-5'-methylphenyl)benzotriazole, 2-(3', 5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl]benzotriazole, 2-(3'-5'-di-tert-butyl-2'-hydroxyhenyl)-5-chlorobenzotriazole, 2-(3'tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxy-phenyl)benzotriazole, 2-(3',5'-bis(ΘΘ-dimethylbenzyl)-2'hydroxyphenyl)benzotriazole; mixture of 2-(3'-tert-butyl-2'-hydroxy-5'-(2-octyloxycarbonylethyl) phenyl)-5-chlorobenzotriazole, 2-(3'-tert-butyl-5'-[2-(2-ethylhexyloxy)carbonylethyl]-2'-hydroxyphenyl)-5-chlorobenzo-triazole, 2-(3'-tert-butyl-2'-hydroxy-5'-(2-methyxycarbonylethyl)phenyl)-5-chlorobenzotriazole, 2-(3'-tert-butyl-2'-hydroxy-5'-(2-methoxycarbonylethyl) phenyl)benzo-triazole, 2-(3'-tert-butyl-2'-hydroxy-(2-octyloxy-carbonylethyl)phenyl)benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctylocycarbonylethyl) phenylbenzotriazole, 2,2'-methylenebis[4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl]benzo-triazole with polyethylene glycol 300; [R—CH$_2$CH$_2$—COO(CH$_2$)$_3$]$_2$ where R=3'-tert-butyl-4'-hydroxy-5'-2H-benzotriazol-2-ylphenyl; [R—CH$_2$CH$_2$—COO(CH$_2$CH$_2$O)$_{N/2}$]$_2$ where n=1 to 5 and R-3'-tert-butyl-4'hydroxy-5'-2H-benzotriazol-2-ylphenyl. A suitable commercially available benzotriazole is Norbloc® 7966, and 6000, from Jensen Pharma., Inc. Benzotriazoles are disclosed in U.S. Pat. Nos. 4,335,155, 4,405, 749, and 4,528,311 which are incorporated herein by reference.

The triazines include, for example, 2-(2-hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecycloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-dimethylphenyl)-1,3,5-triazine and 2-hydroxy-4-(2-hydroxy-3-octyloxypropyloxy)-phenyl]-4, 6-bis (2,4-dimethylphenyl)-1,3,5-triazine. A suitable commercially available triazine is CYASORB® 1164, from Cyanamid Corp.

Hindered benzoate UV absorbers include commercially available materials such as CYASORB® 2908 from Cyanamid, and FERRO® AM 340 from Ferro Corp.

EXAMPLES

In the comparative examples and in the exemplary non-limiting embodiments of the invention described here under, the following types of polyamide-based polymers and additives are used:

1) PA-1 a polyamide 6 of the low-viscosity type suitable especially for injection molding and commercially available as Capron® 8202 NL from Allied Signal Corp.

2) PA-2 a transparent, amorphous, polyamide-polyether block copolymer suitable for injection molding.

3) PA-3 a semi-gloss polyamide 6 containing 0.3 wt. % of $TiO_2$ commercially available as Nylon 6 SD 1130 from DSM.

4) PS-1 a sterically hindered phosphonite processing stabilizer commercially available as Sandostab® P-EPQ from Clariant.

5) PS-2 a primary hindered phenol antioxidant of the compound (III) commercially available as Irganox® 1098 from Ciba Specialty Chemicals, Basle Switzerland and believed to have the following structure:

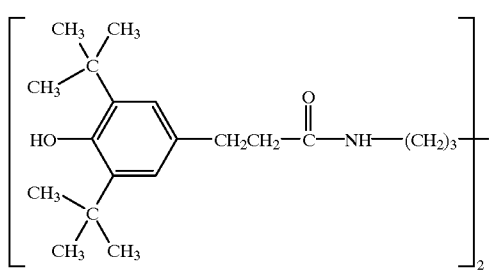

6) PS-3 an antioxidant which is a compound of the formula (IV):

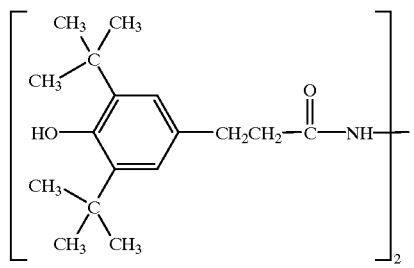

PS-3 is commercially available as Irganox® MD 1024 from Ciba Specialty Chemicals, Basle, Switzerland.

7) LS-1 A non-hydroxyl substituted oxanilide UV-absorber commercially available as Sanduvor® VSU from Clariant, having the following structure (I):

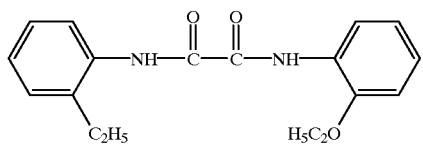

8) LS-2 An aromatic hindered piperidine UV stabilizer commercially available as Nylostab® S-EED from Clariant, and which is a compound of formula (II):

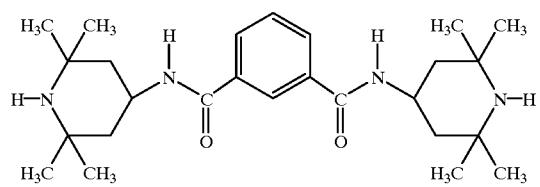

9) LS-3 a UV-stabilizer which is a compound of formula (V)

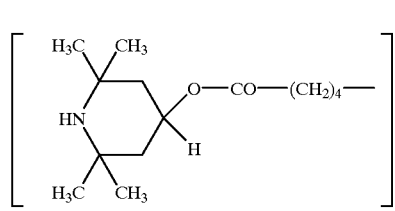

(Commercially available for example as Tinuvin (RTM) 770 from Ciba Specialty Chemicals in Basle/Switzerland).

10) LS-4 a UV-stabilizer which is a compound of formula (VI)

(VI)

[chemical structure]

(Commercially available for example as Chimassorb (RTM) 944 from Ciba Specialty Chemicals in Basle/Switzerland or as Sanduvor (RTM) 3944 from Clariant in Muttenz/Switzerland).

(11) LS-5 A UV-absorber which is a compound of formula (VII)

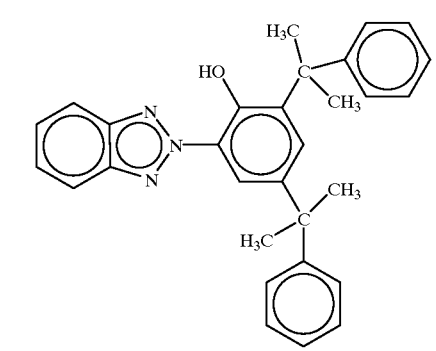

Commercially available for example as TINUVIN 234 from Ciba Specialty Chemicals in Basle, Switzerland.

12) LS-6 a UV-absorber which is a compound of formula (VIII)

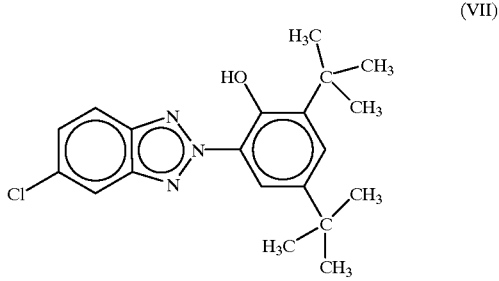

(VII)

Commercially available as TINUVIN 327 from Ciba Specialty Chemicals. The tested samples were prepared as follows. According to the formulations described hereunder, the different types of polyamides were first melt compounded with the tested additives and extruded at temperatures of from 250–280 Celcius, followed by pelletizing into homogeneous pellets. These pellets were formed into panels 1 mm thick by injection molding at temperatures of from 280 to 300 Celcius, followed by either punching of the tested samples to 35 mm×40 mm or by direct injection molding of tensile bar specimens The color quality is reported in terms of the Yellowness Index (YI) determined in accordance with the ASTM E-313 Yellowness Test. The higher the value, the lower the color quality, i.e. the worse the discoloration.

In addition the color is measured according to the regulations of the CIE (International Commission on Illumination) and in accordance with the ISO 7724/3 and DIN 6174 standards. The higher the positive value of b*, the higher the yellowing.

The tensile strength is measured in accordance with the ASTM D-638 standard

The accelerated weathering test (Atlas WOM 65 WRC) is carried out according to the DIN 53387-A standard.

The results of the tests carried out with stabilizer compositions according to the invention and with stabilizers according to the prior art (for comparative purposes) applied to different types of polyamides are summarized in the tables 1–3.

TABLE 1

Yellowness index and b*-value of the various formulations containing PA-1 as polymer after processing into the tested samples

| No. | Formulation | Yellowness Index | b*-value |
|---|---|---|---|
| 1 | reference sample | 1.36 | 0.61 |
| 2 | 0.1% PS-1 | 0.71 | 0.31 |
| 3 | 0.5% LS-1 | 4.03 | 1.79 |
| 4 | 0.1%/0.5% PS-1/LS-1 | −2.42 | −1.06 |
| 5 | 0.5% LS-2 | 3.87 | 1.70 |
| 6 | 0.1%/0.5% PS-1/LS-2 | −4.57 | −1.98 |
| 7 | 0.5% LS-5 | 17.20 | 7.86 |
| 8 | 0.1%/0.5% PS-1/LS-5 | 15.07 | 6.85 |
| 9 | 0.5% LS-6 | 14.29 | 6.52 |
| 10 | 0.1%/0.5% PS-1/LS-6 | 12.96 | 5.88 |

Test numbers 4 and 6 of table 1 are formulations according to the invention, test numbers 7–10 table 1 are comparative tests.

The effect of the processing stabilizer PS-1 to improve the values of yellowing can be seen from the results shown in table 1. From the data of this table it can also be gathered that the preferable use of the UV-stabilizers LS-1 and LS-2 is clearly appropriate, although up to now some minor worsening had to be accepted in the preparation of light-stabilized polyamides.

Therefore, the synergism observed with the stabilizer composition according to the invention is totally unexpected. In spite of the high thermical stress during the processing of the polyamides into the tested samples, yellowing does not occur at all. The measured values of the Yellowness Index and of the b*-value do not only achieve the level of the reference sample but exceed the quality of the reference sample in a significant manner.

The comparative tests show that the use of the processing stabilizer PS-1 in combination with her light stabilizers than those according to the invention, such as LS-5 and LS-6 lead to minor improvements of the yellowing values; the synergism caused by the stabilizer composition according to the invention is not observed and the synergism is limited to the composition according to the invention only.

TABLE 2

Tensile strength (TS) and b*-value of various formulations containing PA-2 as polymer after exposure to accelerated weathering (WOM 65 WRC) for 1800 hours

| No. | Formulation always with 0.2% PS-2 | b*-value | TS (% of the original value) |
|---|---|---|---|
| 1 | reference sample | 7.85 | 29 |
| 2 | 0.6% LS-1 | 4.04 | 84 |
| 3 | 0.6% LS-2 | 4.71 | 39 |
| 4 | 0.6% LS-3 | 4.65 | 49 |
| 5 | 0.6% LS-4 | 5.40 | 40 |
| 6 | 0.3%/0.3% LS-1/LS-2 | 2.62 | 96 |
| 7 | 0.3%/0.3% LS-1/LS-3 | 3.05 | 88 |
| 8 | 0.3%/0.3% LS-1/LS-4 | 3.58 | 82 |

Test number 6 of table 2 is a formulation according to the invention, test numbers 7 and 8 of table 2 are comparative tests.

If light stabilizer are not used the weathering causes a markedly increase of the yellowing value as well as a distinct worsening of the mechanical properties of PA-2 (cf. reference sample). Further, the data of table 2 shows the high efficacy of the UV-stabilizer LS-1 exceeding clearly the effectiveness of the UV-stabilizers LS-2, LS-3 and LS-4 in view of the yellowing value b* and the tensile strength. As it is obvious from table 2, the combination of LS-1 and LS-2 surprisingly results in a pronounced synergism enabling the production of polyamides having a markedly improved light fastness, i.e. resistance against yellowing, as well as a better UV-fastness, i.e. retaining the mechanical properties.

TABLE 3

Table 3 illustrates b*-values and condition of the tested samples containing PA-3 as polyamide after exposure to accelerated weathering (WOM 65 WRC) at the time indicated

| No. | Formulation always with 0.25 wt. % PS-2 | b*-value | Time of embrittlement |
|---|---|---|---|
| 1 | reference sample | n.d.[1] | 3000 h |
| 2 | 0.5%/0.25% LS1/LS-2 | 2.6 | >4000 h |
| 3 | 0.5%/0.25% LS-1/LS-3 | n.d[1] | 3000 h |
| 4 | 0.5%/0.25% LS!/LS4 | 3.3 | >4000 |
| 5 | 0.5%/0.25% LS-5/LS 2 | 5.6 | >4000 h |
| 6 | 0.5%/0.25% LS-5/LS-3 | 4.6 | >4000 h |
| 7 | 0.5%/0.25% LS-5/LS-4 | 4.7 | >4000 h | n.d.[1] sample decomposed—not measurable

Test number 2 of Table 3 is a formulation according to the invention; test numbers 3 to 7 of Table 3 are comparative tests.

In this test series, samples were exposed to accelerated weathering for up to 4000 hours followed by measurement of b*-yellowing, and evaluation of embrittlement. The stabilized polyamide containing LS-1 with LS-2 according to the invention showed outstanding efficiency with regard to yellowing resistance and retention of mechanical properties. The stablizer combination of No. 2, far out-performed those of combinations of LS-1/LS2, LS-1/LS-3, and LS1/LS-4, evidencing an unexpected and unique result.

We claim:

1. A process for using a synergistic additive system with polyamide polymers comprising incorporating said system as a uniform and intimate mixture with said polyamide, said system on a weight basis, is selected from the group consisting of (I) and (II), wherein
    (I) is from 0.01% to 1% of a sterically hindered phenyl phosphonite (Ia) with from 0.05% to 5% of a non-hydroxyl substituted oxanilide (Ib), or said Ia together with an aromatic di-carbonyl compound containing one or more hindered amine moieties (Ic), and
    (II) is from 0.05 to 5% of a non-hydroxyl substituted oxanilide (IIa) together with from 0.05 to 5% of an aromatic di-carbonyl compound (IIb) containing one or more hindered amine moieties.

2. The process according to claim 1 wherein the weight ratio of Ia to Ib is from 1:3 to 1:10, the weight ratio of Ia to Ic is from 1:3 to 1:10 and the weight ratio of IIa to IIb is from 1:5 to 5:1.

3. The process according to claim 1 wherein the weight ratio of Ia to Ib is from 1:3 to 1:6, the weight ratio of Ia to Ic is from 1:3 to 1:6 and the weight ratio of IIa to IIb is from 1:2 to 3:1.

4. The process according to claim 1 wherein the weight ratio of Ia to Ib and Ia to Ic is from 1:4, 1:5 or 1:6, and the weight ratio of IIa to IIb is from 1:2 to 2:1.

5. The process of claim 1 wherein said sterically hindered phenyl phosphonite has the following structure:

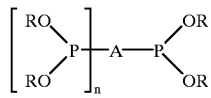

wherein each R is independently an unsubstituted phenyl or a substituted phenyl with one two or three alkyl groups having from 1 to 12 carbon atoms, n is 0 or 1, and A is a monofunctional or difunctional residue of a phenyl, diphenyl, diphenyl ether, diphenylmethane, or dibenzofuran group.

6. The process of claim 5 wherein said sterically hindered phenyl phosphonite comprises a reaction product of the condensation of a hindered alkylphenol with the Friedel-Crafts-reaction product of biphenyl and PCl$_3$.

7. The process of claim 6 wherein said sterically hindered phenyl phosphonite contains

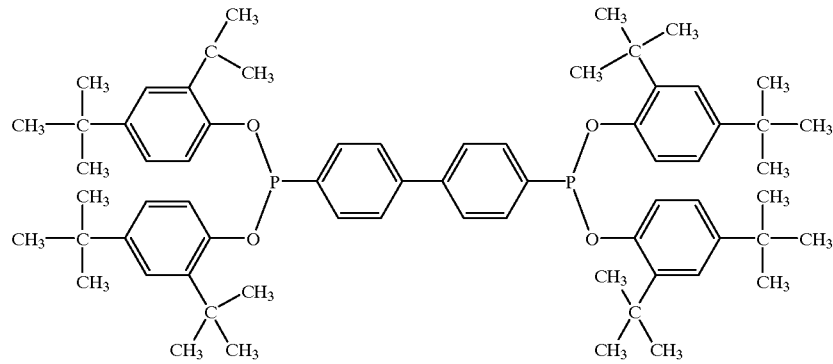

8. The process of claim 6 said sterically hindered alkyl phenol is selected from the group consisting of 2,4-di-t-butyl phenol and 2,4-di-t-butyl-5-methyl phenol.

9. The process of claim 7 wherein said non-hydroxyl substituted oxanilide in (I) or (II) has the following structure:

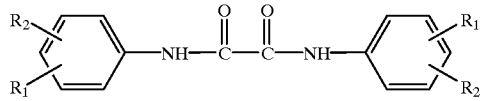

wherein R$_1$ and R$_2$ are each independently, identical or different substituents selected from the group consisting of hydrogen, linear or branched alkyl having 1 to 12 carbons, alkoxy groups having 1 to 12 carbon atoms and 1 to 4 oxygen atoms.

10. The process of claim 9 wherein each R$_1$ is an ethyl group and each R$_2$ is an ethoxyl group.

11. The process of claim 1 wherein (II) is selected and wherein said aromatic di-carbonyl compound in (II) is:

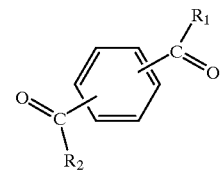

wherein R$_1$ and R$_2$ are identical or different and selected from the group consisting of:

(I)

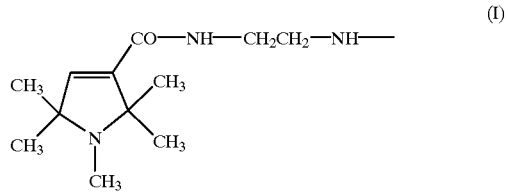

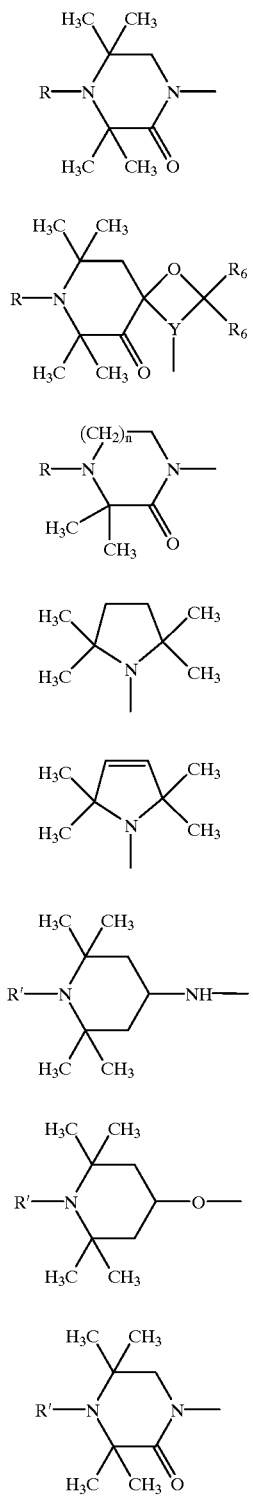

$R_{16}$ is $C_{1-12}$-alkyl or hydrogen or $R_{15}$ and $R_{16}$ together with the N atom to which they are attached form a five- to seven-membered ring which may contain an additional N or O atom (preferably forming a piperidine or morpholine ring); and Y is the group

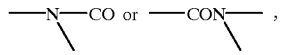

where CO forms part of the cyclic structure; each $R_6$ of structure (III) independently is selected from hydrogen, $C_{1-2}$ alkyl or phenyl provided only one $R_6$ can be phenyl, or both groups $R_6$ together form the group $-(CH_2-(CH_2)_n$ where n is 1 or 2, $-C(CH_3)_2$, $-C(CH_3)_2-CH_2-CH_2-$ or $-C(CH_3CH_2CH_2CH(CH_3)-$.

12. The process of claim 11 wherein said aromatic di-carbonyl has the following structure:

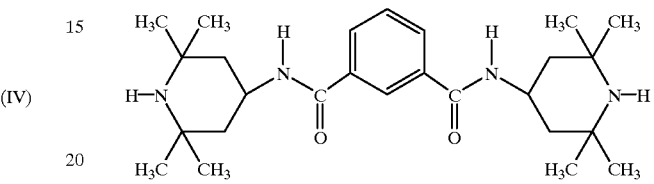

13. The process of claim 6 wherein said aromatic di-carbonyl has the structure:

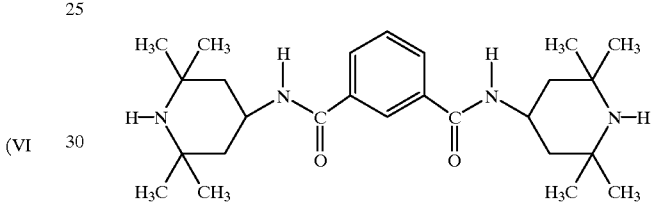

and said non-hydroxyl substituted oxanilide has the following structure:

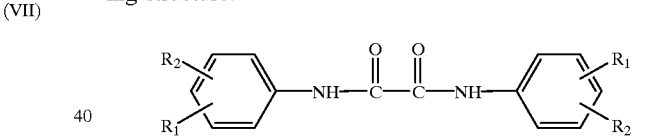

wherein $R_1$ and $R_2$ are each independently, identical or different substituent selected from hydrogen, linear or branched alkyl or alkoxy groups having from 2 to 12 carbon atoms and from 1 to 4 oxygen atoms.

14. A polyamide article selected from the group consisting of a molded article, an extruded article or fiber which comprises polyamide, an organic dye and in intimate homogeneous mixture therewith, a stabilizer system selected from the group consisting of
   (I) from 0.01% to 1% of a sterically hindered phenyl phosphonite (Ia) with from 0.05% to 5% of a non-hydroxyl substituted oxanilide(Ib) or said Ia together with an aromatic di-carbonyl compound containing at least one hindered amine moiety (Ic); and
   (II) from 0.05 to 5% of a non-hydroxyl substituted oxanilide (IIa) together with from 0.05% to 5% of an aromatic di-carbonyl compound containing at least one hindered amine moiety (IIb), said article containing an organic dye.

15. The article of claim 14 wherein the weight ratio of Ia to Ib is from 1:3 to 1:10, the weight ratio of Ia to Ic is from 1:3 to 1:10, and the weight ratio of IIa to IIb is from 1:5 to 5:1.

16. The article of claim 14 wherein the weight ratio of Ia to Ib is 1:3 to 1:6, the weight ratio of Ia to Ic is from 1:3 to 1:6 and the weight ratio of IIa to IIb is from 1:2 to 3:1.

17. The article of claim 14 wherein the weight ratio of Ia to Ib is 1:4, 1:5 or 1:6, the weight ratio of Ia to Ic is 1:4, 1:5 or 1:6, and the weight ratio of IIa to IIb is from 1:2 to 2:1.

18. The article of claim 14 wherein (I) is selected.

19. The article of claim 14 wherein (II) is selected.

20. The article of claim 14 wherein said sterically hindered phenyl phosphonite has the following structure:

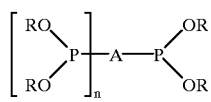

wherein R is the same or a different unsubstituted phenyl or a substituted phenyl with one two or three alkyl groups having from 1 to 12 carbon atoms, n is 0 or 1, and A is a monofunctional or difunctional residue of a phenyl, diphenyl, diphenyl ether, diphenylmethane, or dibenzofuran group.

21. The article of claim 14 wherein said sterically hindered phenyl phosphonite comprises a reaction product of the condensation of hindered alkyl phenol with the Friedel-Crafts-reaction product of biphenyl and $PCl_3$.

22. The article of claim 21 wherein said sterically hindered phenyl phosphonite contains

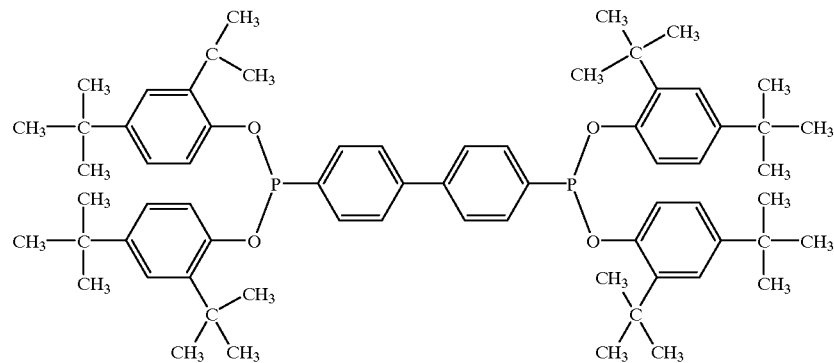

23. The article of claim 21 wherein said sterically hindered alkyl phenol is selected from the group consisting of 2,4-di-t-butyl phenol and 2,4-di-t-butyl-5-methyl phenol.

* * * * *